(12) United States Patent
Su et al.

(10) Patent No.: US 9,996,523 B1
(45) Date of Patent: Jun. 12, 2018

(54) SYSTEM FOR REAL-TIME AUTOSUGGESTION OF RELATED OBJECTS

(71) Applicant: Google Inc., Mountain View, CA (US)

(72) Inventors: Jennifer Su, San Francisco, CA (US); Christian Posse, Belmont, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 15/391,977

(22) Filed: Dec. 28, 2016

(51) Int. Cl.
*G06F 17/00* (2006.01)
*G06F 17/27* (2006.01)
*G06F 3/0482* (2013.01)

(52) U.S. Cl.
CPC .......... *G06F 17/276* (2013.01); *G06F 3/0482* (2013.01)

(58) Field of Classification Search
CPC . G06F 17/30; G06F 17/30038; G06F 17/3005
USPC ........................................................ 707/765
See application file for complete search history.

(56) References Cited

U.S. PATENT DOCUMENTS

| | | | |
|---|---|---|---|
| 6,006,225 A * | 12/1999 | Bowman | G06F 17/30395 |
| 6,370,510 B1 | 4/2002 | McGovern et al. | |
| 6,564,213 B1 * | 5/2003 | Ortega | G06F 17/3064 |
| 7,555,441 B2 | 6/2009 | Crow et al. | |
| 7,734,627 B1 | 6/2010 | Tong | |
| 7,761,320 B2 | 7/2010 | Fliess et al. | |
| 8,117,024 B2 | 2/2012 | Dane | |
| 8,438,137 B2 | 5/2013 | Gold et al. | |
| 8,601,019 B1 | 12/2013 | Weininger et al. | |
| 8,650,177 B2 | 2/2014 | Skomoroch et al. | |
| 9,298,724 B1 | 3/2016 | Patil et al. | |
| 2008/0065630 A1 | 3/2008 | Luo et al. | |
| 2008/0086366 A1 | 4/2008 | Concordia et al. | |
| 2008/0177717 A1 * | 7/2008 | Kumar | G06F 17/3064 |
| 2009/0276415 A1 | 11/2009 | Dane | |

(Continued)

FOREIGN PATENT DOCUMENTS

| | | |
|---|---|---|
| CA | 2484440 | 4/2005 |
| WO | WO 00/26839 | 5/2000 |

(Continued)

OTHER PUBLICATIONS

Barkley et al., "Pivot" 2015 Master's Project, University of California, Berkeley, 61 pages.

(Continued)

*Primary Examiner* — Daniel Abebe
(74) *Attorney, Agent, or Firm* — Dority & Manning, P.A.

(57) ABSTRACT

Systems and methods for autosuggesting related objects to a user are provided. In one embodiment, a method includes receiving data indicative of a user input. The method includes identifying one or more ontologies based, at least in part, on the user input. Each ontology is associated with a category that is related to the user input. Each ontology includes a plurality of object types, each object type including one or more terms. The method includes determining one or more suggested related objects based, at least in part, on the user input and one or more of the plurality of object types. The one or more suggested related objects include one or more of the terms that are related to the user input. The method includes providing data indicative of the suggested related objects for display on a user interface via a display device.

24 Claims, 7 Drawing Sheets

(56) References Cited

U.S. PATENT DOCUMENTS

| | | | |
|---|---|---|---|
| 2011/0029514 A1* | 2/2011 | Kerschberg | G06F 17/30648 707/732 |
| 2013/0218620 A1 | 8/2013 | Liu et al. | |
| 2013/0290366 A1* | 10/2013 | Boyle | G06F 17/30672 707/767 |
| 2014/0081928 A1 | 3/2014 | Skomoroch et al. | |
| 2014/0122516 A1* | 5/2014 | Brewer | G06F 17/3064 707/767 |
| 2016/0188608 A1* | 6/2016 | Brewer | G06F 17/3064 707/767 |

FOREIGN PATENT DOCUMENTS

| | | |
|---|---|---|
| WO | WO 01/004811 | 1/2001 |
| WO | WO 2005/038584 | 4/2005 |
| WO | WO 2008/034114 | 3/2008 |
| WO | WO 2010/009370 | 1/2010 |
| WO | WO 2016/053382 | 4/2016 |

OTHER PUBLICATIONS

Carty, "Did Indeed Hide Your Job Postings? Deduplication Explained", www.retruitingblogs.com/profiles/blogs/did-indeed-hide-your-job-postings-deduplication-explained, retrieved on Nov. 30, 2016, 10 pages.

Facebook Screenshot of "produ", retrieved on Dec. 19, 2016, 1 page.

Javed et al., "Towards a Job Title Classification System", arXiv:1606,00917v1, 2016—4 pages.

Kivimaki et al., "A Graph-Based Approach to Skill Extraction from Text", Proceedings of the TextGraphs-8 Workshop, Seattle, Washington, Oct. 18, 2013, pp. 79-87.

Lamche et al., "Interactive Explanations in Mobile Shopping Recommender Systems", ACM Conference Series on Recommender Systems—Joint Workshop on Interfaces and Human Decision Making for Recommender Systems, Foster City, Silicon Valley, California, Oct. 6, 2014, 8 pages.

Li et al., "One Permutation Hashing", Proceedings of the $25^{th}$ International Conference on Neural Information Processing Systems, Lake Tahoe, Nevada, Dec. 3-6, 2012, 9 pages.

LinkedIn Screenshot of "pro", retrieved on Dec. 19, 2016, 1 page.

"Near-Duplicates and Shingling", http://nlp.stanford.edu/IR-book/html/htmledition/near-duplicates-and-shingling-1, retrieved on Nov. 30, 2016, 5 pages.

Pathak, "Combating Web Plagiarism and Improving Internet Safety by Authenticating Web Content", 2010 International Conference for Internet Technology and Secured Transactions, London, United Kingdom, Nov. 8-11, 2010, 6 pages.

Spirin et al., "Unsupervised Approach to Generate Informative Structured Snippets for Job Search Engines", Proceedings of the $22^{nd}$ International Conference on World Wide Web Companion, Rio de Janeiro, Brazil, May 13-17, 2013, pp. 203-204.

Tintarev et al., "A Survey of Explanations in Recommender Systems", Proceedings of the 2007 IEEE $23^{rd}$ Conference on Data Engineering Workshop, Istanbul, Turkey, Apr. 17-20, 2007, pp. 801-810.

Wikipedia "MinHash", https://en.wikipedia.org/wiki/MinHash, retrieved on Dec. 19, 2016, 6 pages.

Zhao et al., "SKILL: A System, for Skill Identification and Normalization", Proceedings of the Twenty-Seventh Conference on Innovative Applications of Artificial Intelligence, Austin, Texas, Jan. 25-30, 2015, pp. 4012-4017.

* cited by examiner

SYSTEM FOR REAL-TIME AUTOSUGGESTION OF RELATED OBJECTS

FIELD

The present disclosure relates generally to autosuggesting objects related to a user input provided by a user via a user interface.

BACKGROUND

Often, users have difficulty in knowing what terms to enter into a search query to retrieve the desired results. Even users who know what they want have a difficult time effectively searching. In both cases the user has an idea of what to search for but does not have the knowledge or ability to create a comprehensive vocabulary for a search. This causes the user to lose out on information and leads to poor search results. While common search engines provide auto-completion based on frequent searches and previous search history to assist the user, such feature can be limiting because it only returns the exact search or partial search of the user input.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of autosuggesting related objects to a user. The method includes receiving, by one or more computing devices, data indicative of a user input that includes an n-gram of one or more characters. The method includes identifying, by the one or more computing devices, one or more ontologies based at least in part on the user input. Each ontology is associated with a category that is related to the user input. Each ontology includes a plurality of object types. Each object type includes one or more terms. The method includes determining, by the one or more computing devices, one or more suggested related objects based at least in part on the user input and one or more of the plurality of object types. The one or more suggested related objects include one or more of the terms that are related to the user input. The method includes providing, by the one or more computing devices, data indicative of the suggested related objects for display on a user interface via a display device.

Another example aspect of the present disclosure is directed to a computing system for autosuggesting related objects to a user. The computing system includes one or more processors and one or more memory devices. The one or more memory devices store instructions that when executed by the one or more processors cause the one or more processors to perform operations. The operations include receiving data indicative of a user input that includes an n-gram of one or more characters. The operations include identifying one or more autocomplete suggestions for the user input. The operations include identifying one or more ontologies based at least in part on at least one of the user input and the autocomplete suggestions for the user input. Each ontology is associated with a category that is related to at least one of the user input and the autocomplete suggestions for the user input. Each ontology includes a plurality of object types. Each object type includes one or more terms. The operations include determining one or more suggested related objects based at least in part on one or more of the plurality of object types. The one or more suggested related objects include one or more of the terms that are related to at least one of the user input and the autocomplete suggestions. The operations include providing data indicative of the suggested related objects for display on a user interface via a display device.

Yet another example aspect of the present disclosure is directed to one or more tangible, non-transitory computer-readable media storing computer-readable instructions that when executed by one or more processors cause the one or more processors to perform operations. The operations include receiving data indicative of a user input that includes an n-gram of one or more characters. The operations include identifying one or more autocomplete suggestions for the user input. The operations include identifying one or more ontologies based at least in part on at least one of the user input and the autocomplete suggestions for the user input. Each ontology is associated with a category that is related to at least one of the user input and the autocomplete suggestions for the user input. Each ontology includes a plurality of object types. Each object type includes one or more terms. The operations include determining one or more suggested related objects based at least in part on one or more of the plurality of object types and at least one of the user input and the autocomplete suggestions for the user input. The operations include providing data indicative of the suggested related objects for display on a user interface via a display device.

Other example aspects of the present disclosure are directed to systems, apparatuses, tangible, non-transitory computer-readable media, user interfaces, memory devices, and electronic devices for autosuggesting related objects to a user.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
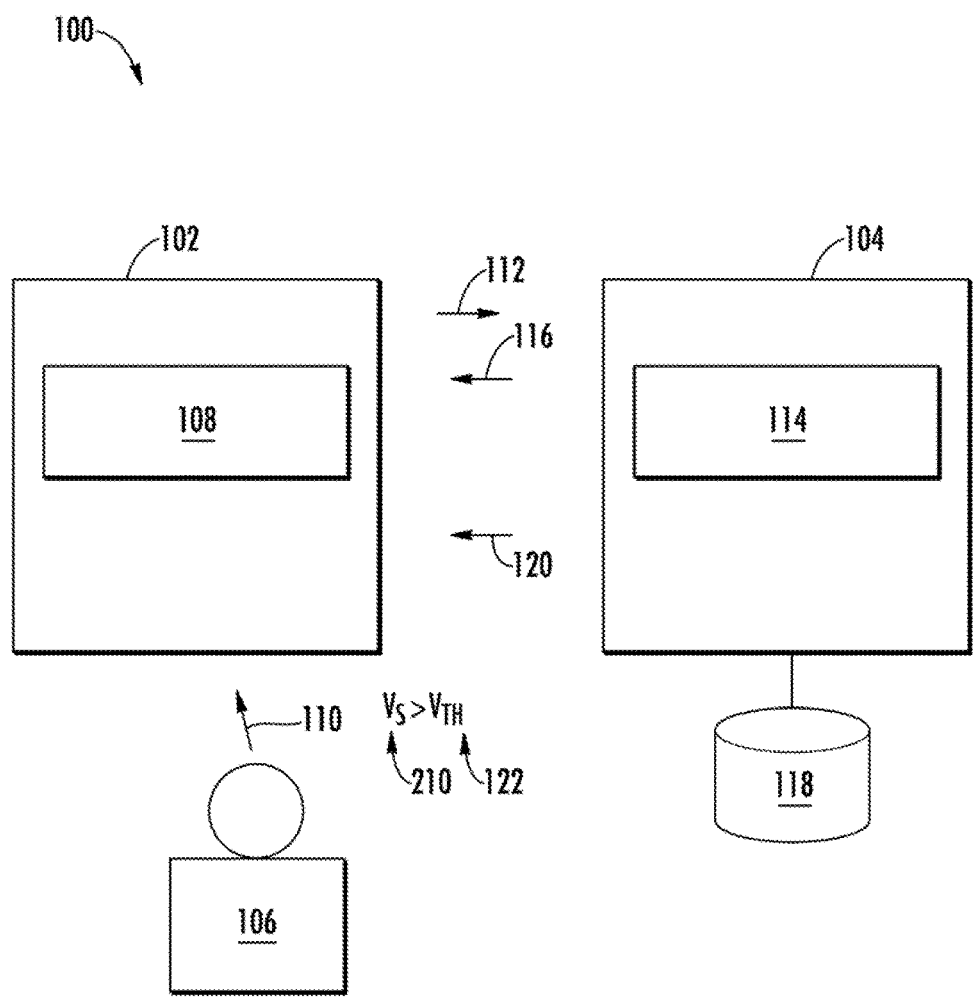
FIG. 1 depicts an example system for autosuggesting related objects to a user according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to enabling users to more efficiently identify a desired object (e.g., a term, image, picture, etc.), even when the user does not know the correct descriptor for the object. For instance, a user can provide user input (e.g., a search query) via a user interface presented on a user computing device (e.g., mobile phone). The user input can include an n-gram of one or more character(s). For example, the user input can include the characters/terms "SKIN DIS" as the user enters the characters into the user interface with the intention of searching for skin related diseases. The user device can communicate with a computing system (e.g., a server-based system) to determine objects (e.g., terms, images, pictures, etc.) that are related to the user input, besides just objects that exactly match the user input.

For instance, the computing system can receive data indicative of the user input and, in some implementations, autocomplete the user input. The computing system can access a database that includes a plurality of ontologies. An ontology can be data structure that includes a plurality of nodes (e.g., in a tree structure) that can be used for identifying objects that are related to the user input (and/or autocomplete suggestions). For example, based, at least in part, on the user input and/or the autocomplete suggestions for the user input, the computing system can identify an ontology that is associated with a category (e.g., skin related medical issues) related to the user input (and/or the autocomplete suggestions). The ontology can include a plurality of object types (e.g., represented in the nodes), each object type can include one or more object(s) (e.g., terms). The computing system can use the user input (and/or the autocomplete suggestions) to navigate the object types of the ontology to determine suggested related objects that are related to the user input (and/or the autocomplete suggestions). For example, the suggested related objects can include one or more term(s) that are related to the user input (and/or the autocomplete suggestions). The suggested related objects can include terms that do not exactly match the characters of the user input, but are nonetheless related to the user input. For example, the suggested related objects can include the terms psoriasis, eczema, acne, etc. for the user input "SKIN DIS". The computing system can provide the suggested related objects for display via the user computing device, such that the user can view the suggestions. One of the suggestions may then be selected by the user, for instance to form the basis of a search in order to obtain additional information relating to the selected suggestion. In this way, the systems and methods can expand the user input (e.g., search query) beyond simply exact matches and/or autocomplete suggestions and thereby facilitate efficient identification of a desired object even when the user does not know the correct descriptor for the object. Moreover, the systems and methods can map the user input with the ontologies to accomplish such expansion, without having to track individual user behavior.

As will be appreciated, the systems and methods described herein may enable presentation to a user of a relevant object even when the characters in the user input do not match a descriptor, or part thereof, associated with that object. As such, the amount of user-device interaction required for the user to identify the object (and the associated use of computational resources—e.g., bandwidth, processing etc.) may be reduced. Moreover, because the descriptors of the suggested related objects do not necessarily include the characters of the original n-gram, the methods and apparatuses may be particularly useful in situations in which the user does not know the correct descriptor of the object they have in mind. This may occur, for instance, but not exclusively, when the user is inputting the user input in a language other than their native language. Similarly, it may occur when the user input relates to a field in which complex terminology, with which the user is unfamiliar, is prevalent. For instance, when using a search engine to search for information relating to a medical term (e.g. a condition, for purposes of self-diagnosis), the user may not know the correct name of the condition. However, by automatically providing suggested related objects (e.g. terms, photos, etc.), the descriptors of which may or may not include the characters of the user input, it is more likely that the user will be able to select the condition for which they are searching, and thereby receive the desired information.

In addition, because the systems and methods are able to suggest relevant related objects without relying on the collection of behavioral data associated with the user (e.g. browsing history, etc.), the user's sensitive data may be more secure. Also, it may mean that the above-described benefits may be provided from the first time the user makes use of the method.

More particularly, a system according to example embodiments of the present disclosure can include a user computing device and a computing system. The user computing device can include, for example, a mobile phone, laptop computer, tablet, desktop computer, and/or other types of mobile or non-mobile user devices. The computing system can include a web-based server system that is remote from the user computing device. The user computing device and the computing system can communicate with one another via one or more network(s) (e.g., one or more wireless network(s)). One or both of the user computing device and/or computing system can perform one or more of the operation(s) and function(s) described herein for auto-suggesting related objects to a user of the user computing device.

For example, the user computing device can receive user input. The user input can include an n-gram. The n-gram can include, for example, one or more character(s). The n-gram can form one or more word(s) and/or one or more partial word(s). By way of example, a user intending to search for skin related diseases may provide (e.g., via a keypad, touchscreen) the user input "SKIN DIS". In some implementations, this may represent only a portion of the user input as the user continues to provide user input. However, the systems and methods of the present disclosure can be performed while the user is still providing (e.g., typing) the user input, thus expanding the user input in real-time and/or near real-time. The user computing device can provide data indicative of the user input to the computing system.

In some implementations, the computing system can auto-complete the user input. The computing system can determine one or more autocomplete suggestion(s) based, at least in part, on the n-gram of character(s) included in the user input. By way of example, the computing system can determine an autocomplete suggestion, such as, "SKIN DISEASE" for the user input "SKIN DIS" and provide the autocomplete suggestion to the user (e.g., via the user interface on the user computing device). The user can select the autocomplete suggestion in the event that the user desires to include such a suggestion in a corresponding search.

The computing system can identify one or more ontologies to help determine one or more suggested related object(s) based, at least in part, on the user input and/or the autocomplete suggestions. For instance, the computing system can access one or more memory device(s) that store data indicative of a plurality of ontologies. Each ontology can be a data structure and/or data model. The structure and/or model can include, for example, a plurality of nodes (e.g., in a tree structure). The nodes can include object types that can be used for identifying objects (e.g., terms, images, pictorial representations, or the like) that are related to the user input (and/or autocomplete suggestions). The computing system can select one or more ontologies of the plurality of ontologies that are associated with a category related to the user input. For example, the computing system can select an ontology that is associated with skin related medical issues based, at least in part, on the user input (e.g., "SKIN DIS") and/or the autocomplete suggestions (e.g., "SKIN DISEASE"). This example ontology can include object types such as "human skin," "skin diseases," "skin disease side effects," "skin medications," "sun effects," etc. Each of these object types can include one or more object(s), such as one or more term(s). For example, the "skin disease side effects" object type may include terms such as "hair loss," "arthritis," etc.

The computing system can determine one or more suggested related object(s) based, at least in part, on the user input (and/or autocomplete suggestions) and the object types of the ontology. For instance, the computing system can process the user input (and/or autocomplete suggestions) using a classifier model to generate one or more vector(s) associated therewith. The computing system can use the vector(s) to determine which object types of the ontology are related to the user input.

In some implementations, the computing system can determine a propensity score of the user input. The propensity score can be indicative of a level of specificity associated with the n-grams of the user input (e.g., the more specific the n-grams, the higher the propensity score). The propensity score can be based at least in part on the n-grams used to generate the autocomplete and/or related objects. For example, when the user input includes the term "in"—the objects that exactly match that input is extremely high. The propensity score can thus be low. The propensity score can include signals such as the n-grams, the number of matches, common usage of exact matched terms, context, etc. that inform an ontology of those exact matches. In some implementations, the propensity score can be used to identify one or more of the ontologies.

Additionally, or alternatively, the computing system can determine a vagueness score of a particular ontology based at least in part on the user input and the respective ontology. For example, the vagueness score can indicate the level of specificity of object type that can be searched within the particular ontology given the state of the user input (e.g., the n-grams included in the user input). For example, in the event that the user input is broad (e.g., "SKIN"), the vagueness score of the user input will be lower, and the computing system will identify broader, more parent-level object types (e.g., "human skin"). In the event that the user input is more specific (e.g., "SKIN DISEASES"), the vagueness score of the user input will be higher, and the computing system will identify more specific object types within the ontology (e.g., "skin disease side effects"). Thus, the computing system can identify one or more object type(s) of the selected ontology based, at least in part, on the user input, the autocomplete suggestions, and/or the vagueness score.

The computing system can determine a confidence score for each of the identified object types. The confidence score can be indicative of the computing system's confidence in the relatedness between the respective object type and the user input. For example, the computing system may have a high confidence level in the relatedness of the object type for "skin disease side effects" and "skin disease medications" for the user input "SKIN DIS," but may have a lower confidence in the object type for "sun effects." The computing system can select the object types that have the highest confidence scores and identify the objects (e.g., terms) associated with those object types as suggested related objects for the user input (and/or the autocompleted suggestions). For example, the computing system can determine that the objects (e.g., terms: "hair loss," "arthritis," "redness") of the object type for "skin disease side effects" are related to the user input and, thus, should be suggested to the user.

The computing system can provide data indicative of the suggested related objects for presentation to the user. For instance, the computing system can provide data indicative of the terms "hair loss," "arthritis," "redness" for display on a user interface via the user computing device (e.g., via an associated display device). In some implementations, the user computing device can provide the suggested related objects in the user interface with the user input (e.g., while and/or after the user enters the user input) and/or the autocomplete suggestions. This can allow the user to view the suggested related objects and, thus, expand the user's search in real-time and/or near real-time.

In some implementations, the computing system (and/or user computing device) can provide the suggested related objects to the user based, at least in part, on the vagueness score (and/or the propensity score). For instance, the vagueness score (and/or the propensity score) can change as the level of specificity associated with the user input changes. As the user provides additional user input for the user input (e.g., types more characters to be included in the user input), the vagueness score (and/or the propensity score) can increase due to the input becoming more specific. An increase in the propensity score can allow the computing system to identify exact matches and/or autocomplete suggests that are more akin to the user input. An increase in the vagueness score can allow the computing system to identify more specific object types within an ontology that can be more closely related to the user input. As such, in some implementations, the computing system can provide the data indicative of the suggested related objects for display on the user interface when the vagueness score of the user input exceeds a threshold. The vagueness score of the user input exceeding the threshold may be interpreted as an indication that that the user input is sufficiently precise that a confidence that the suggested related objects are likely to be relevant to the user input is above a certain level. As such, by providing the data indicative of the suggested related objects only when the vagueness score exceeds the threshold, the computational resources associated with provision and display of the data may be preserved until the suggested related objects are sufficiently likely to be relevant.

The systems and methods of the present disclosure also provide an improvement to computing technology. For instance, the systems and methods enable a computing system to receive data indicative of a user input that includes an n-gram of one or more characters, identify one or more ontologies (each including a plurality of object types) based, at least in part, on the user input, and determine one or more suggested related objects based, at least in part, on the user input and one or more of the plurality of object types. The one or more suggested related objects can include one or more of the terms, images, etc. that are related to the user input. The computing system can provide data indicative of the suggested related objects for display on a user interface via a display device. In this way, the systems and methods of the present disclosure allow a computing system to make suggestions that expand a user input (e.g., search query) without requiring additional input (e.g., keystroke inputs, mouse clicks) from a user. This can decrease the amount of computational resources (e.g., processing units) that would be utilized by the computing system to process such additional user input.

Moreover, the computing system can make suggestions to expand a user input without having to track the behavior of an individual user. For example, the systems and methods allow the computing system to, among other functions, identify an ontology based, at least in part, on the user input and determine the suggested related object based, at least in part, on the ontology (e.g., the associated object types). Accordingly, the computing system need not track the user's interaction with a user interface to predict user preferences and/or user behavior in order to suggest objects (e.g., terms) related to the user input. As such, the computing system can save valuable processing and memory storage resources that would be needed for such tracking and analysis. Instead, those computation resources can be allocated to the more core functions of the computing system such as, for example, suggesting related objects with higher confidence.

With reference now to the FIGS., example embodiments of the present disclosure will be discussed in further detail. FIG. 1 depicts an example system 100 for autosuggesting related objects to a user according to example embodiments of the present disclosure. The system 100 can include a user computing device 102 and a computing system 104. The user computing device 102 and a computing system 104 can be configured to communicate with one another via one or more wired and/or wireless network(s). The network(s) can include one or more public or private network(s), and can include the Internet. While the following description describes the operations and functions for autosuggesting related objects to a user as being performed by the computing system 104, one or more of the operations and functions for autosuggesting related objects to a user could also, or alternatively, be performed by the user computing device 102.

The user computing device 102 can be utilized by a user 106. The user computing device 102 can include, for example, a phone, a smart phone, a computerized watch (e.g., a smart watch), computerized eyewear, computerized headwear, other types of wearable computing devices, a tablet, a personal digital assistant (PDA), a laptop computer, a desktop computer, a gaming system, a media player, an e-book reader, a television platform, a navigation system, a digital camera, an appliance, and/or any other type of mobile and/or non-mobile user computing device. The user computing device 102 can include various computing device(s) (e.g., including processors, memory devices, etc.) for performing the operation and functions, as described herein.

The user computing device 102 can also include one or more display device(s) 108 (e.g., display screen) configured to display a user interface. The user interface can be a graphical user interface that allows a user 106 to provide user input 110 such as, for example, a search query. The user 106 can be a human user and/or a machine user, such as a computing device configured to provide user input to the user computing device 102.

The user input 110 can include an n-gram of one or more character(s). The n-gram can form one or more word(s) and/or one or more partial word(s). By way of example, a user 106 intending to search for skin related diseases may provide (e.g., via a keypad, touchscreen) the user input "SKIN DIS". In some implementations, the n-gram may represent only a portion of the user input 110 as the user 106 continues to provide user input 110. As indicated above, the systems and methods of the present disclosure can be performed while the user 106 is still providing (e.g., speaking, typing, etc.) the user input 110 to expand the user input 110 in real-time and/or near real-time. The user computing device 102 can provide data 112 indicative of the user input 110 to the computing system 104.

The computing system 104 can be included with and/or remote from the user computing device 102. For example, in some implementations, the computing system 104 can be a web-based server system. The computing system 104 can include components for performing various operations and functions as described herein. For instance, the computing system 104 can include one or more computing device(s) 114 (e.g., servers). As will be further described herein, the computing system 104 can include one or more processor(s) and one or more memory device(s). The one or more memory device(s) can store instructions that when executed by the one or more processor(s) cause the one or more processor(s) to perform operations and functions. For example, the computing device(s) 114 can be configured to receive (e.g., from the user computing device 102) the data 112 indicative of the user input 110 that includes the n-gram of one or more character(s) (e.g., "SKIN DIS"). The computing device(s) 114 can be configured to autosuggest objects related to the user input 110.

In some implementations, the computing device(s) 114 can be configured to identify one or more autocomplete suggestion(s) for the user input 110. This can be performed in response to a request (e.g., from the user computing device 102) and/or automatically as the user input 110 is entered by the user 106. The autocomplete suggestion(s) can include one or more word(s) and/or phrase(s) that include the one or more character(s) that were included in the user input 110 (e.g., entered by the user 106). For example, complete words and/or extended phrases can be suggested for partial words and/or partial phrases included in the user input 110 (e.g., that a user 110 has entered via an input component). The autocomplete suggestion(s) can also include words and/or phrases that are similar to (e.g., synonyms of or spelling corrections of) the user input 110. The computing system 104 can provide data 116 indicative of the autocomplete suggestion(s) to the user computing device 102 for selectable presentation in a user interface. A user 106 can interact with (e.g., tap, click, or otherwise affirmatively select) one or more of the provided autocomplete suggestion(s) to enter the suggestion (e.g., the suggested text). Accordingly, the user input 110 can be adjusted to reflect the selected autocomplete suggestions. By way of example, the computing device(s) 114 can determine an autocomplete suggestion, such as, "SKIN DISEASE" for the user input "SKIN DIS." The autocomplete suggestion can be provided to the user 106 via a user interface on the user computing device 102 (e.g. display device 108). The user 106 can select the autocomplete suggestion in the event that the user 106 desires to include such a suggestion in the corresponding input (e.g., search query). In some implementations, the user computing device 102 can permit multiple autocomplete suggestions to be included in the user input 110 (e.g., prior to a user indication that a search query is complete).

Figure 2:
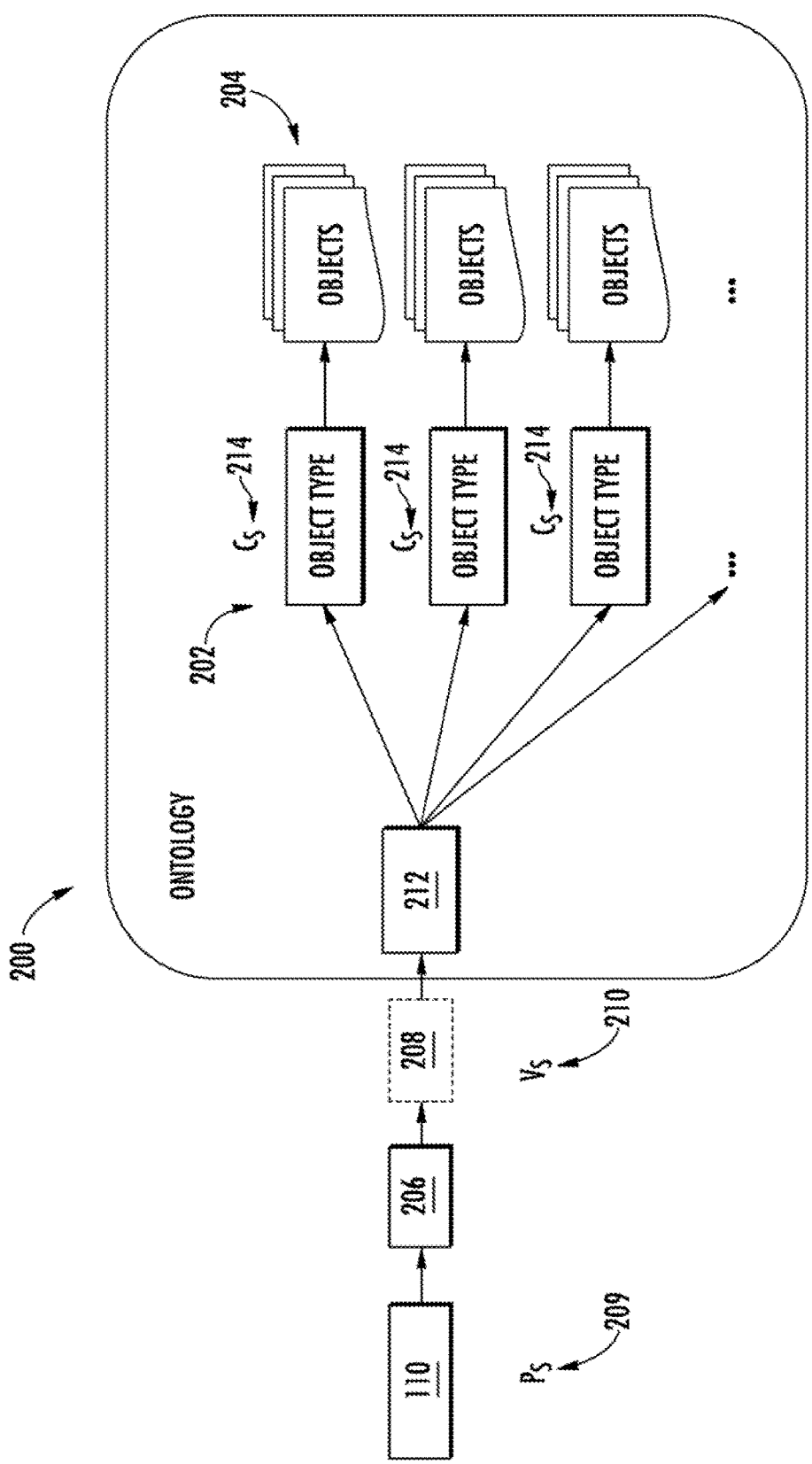
FIG. 2 depicts an example ontology according to example embodiments of the present disclosure.

To help suggest objects related to the user input 110, the computing device(s) 114 can be configured to access a database 118 that includes a plurality of ontologies. For instance, FIG. 2 depicts an example ontology 200 according to example embodiments of the present disclosure. The ontology 200 can be data structure and/or a data model. In some implementations the data structure can include a plurality of entities, nodes, etc. with one or more relationship defines between at least a subset of those entities, nodes, etc. (e.g., in a tree structure). Each entity, node, etc. can include one or more object type(s) 202 that can be used for identifying objects 204 (e.g., included in, associated with the object types 202) that are related to the user input 110 (and/or autocomplete suggestions). The objects 204 can include terms, images, pictorial representations, photos, graphical representations, playable audio sounds, and/or other various types of content.

The computing device(s) 114 can be configured to identify one or more ontologies based at least in part on at least one of the user input and the autocomplete suggestions for the user input. Each ontology can be associated with a category that is related to at least one of the user input 110 and the autocomplete suggestion(s) 206 for the user input 110. The first category of a respective first ontology can be different that a second category of a respective second category. The first and second categories (while different) can both be related to the at least one of the user input 110 and the autocomplete suggestion(s) 206 for the user input 110.

For example, the computing device(s) 114 can identify an ontology 200 based, at least in part, on at least one of the user input 110 and the autocomplete suggestion(s) 206 for the user input 110. For instance, each ontology 200 can be associated with a category that is related to at least one of the user input 110 and the autocomplete suggestion(s) 206 for the user input 110. By way of example, the computing device(s) 114 can select an ontology 200 that is associated with skin related medical issues based, at least in part, on the user input "SKIN DIS" and/or the autocomplete suggestion "SKIN DISEASE". In such an example, the ontology 200 can include object types 202 such as "human skin," "skin diseases," "skin disease side effects," "skin medications," "sun effects," etc. Each of these object types 202 can include one or more object(s) 204, such as one or more term(s). For example, the "skin disease side effects" object type may include terms such as "hair loss," "arthritis," etc.

The computing device(s) 114 can select more than one ontologies based at least in part on the user input 110 and/or the autocomplete suggestions(s) 206. For example, the user input 110 can include the term "sta". Using a field of study ontology, the computing device(s) 110 can estimate that the user wants to type statistics (e.g., which can ultimately lead to a suggest object such as applied math). Using an institution list ontology, the computing device(s) 110 could estimate that the user wants to type Stanford (e.g., e.g., which can ultimately lead to a suggest object such as applied math).

The computing device(s) 114 can be configured to determine one or more suggested related object(s) based, at least in part, on one or more of the plurality of object types 202. The one or more suggested related object(s) can be one or more of the objects 204 (e.g., terms, images, etc.) that are related to the user input 110 and/or the autocomplete suggestion(s) 206. The computing device(s) 114 can map the user input 110 (and/or the autocomplete suggestions 206) to the ontology 200.

The computing device(s) 114 can be configured to select one or more object types 202 of the plurality of object types 202 of the ontology 200 based, at least in part, on the user input 110 (and/or the autocomplete suggestions 206). In some implementations, the computing device(s) 114 can utilize a model 208 to help map the user input 110 (and/or the autocomplete suggestions 206) to the ontology 200. For instance, the computing device(s) 114 can be configured to input the user input 110 (and/or the autocomplete suggestions 206) into a model 208. The model 208 can automatically structure the input so that the computing device(s) 114 can more easily and readily map the input to the selected ontology 200. For example, the model 208 can be a machine-learned classifier model (e.g., neural network) that has been trained using dictionary terms and/or phrases (e.g., using deep learning techniques). The model 208 can create a vector for each term and/or phrase of the user input 110 (and/or the autocomplete suggestions 206). The computing device(s) 114 can input the user input 110 (and/or the autocomplete suggestions 206) into the model 208 to create one or more vector(s) based, at least in part, on the n-gram of one or more character(s) of the user input 110 (and/or the autocomplete suggestions 206). The computing device(s) 114 can use the resulting vectors to identify one or more related object type(s) 202 within the ontology 200. For example, the computing device(s) 114 can identify vectors associated with the object type(s) 202 that are similar to, close to, related to, etc. the vectors (e.g., of the user input and/or the autocomplete suggestions 206) generated via the model 208.

In some implementations, the computing device(s) 114 can determine a propensity score 209 of the user input 110. The propensity score 209 can be indicative of a level of specificity associated with the n-grams of the user input 110 (e.g., the more specific the n-grams, the higher the propensity score). The propensity score 209 can be based at least in part on the n-grams used to generate the autocomplete and/or related objects. For example, when the user input 110 includes the term "in"—the objects that exactly match that input is extremely high. The propensity score 209 can thus be low. The propensity score 209 can include signals such as the n-grams, the number of matches, common usage of exact matched terms, context, etc. that inform an ontology of those exact matches. In some implementations, the computing device(s) 114 can identify one or more ontologies based at least in part on the propensity score 209.

Additionally, or alternatively, the computing device(s) 114 can select one or more object types based, at least in part, on a vagueness score 210. For instance, the computing device(s) 114 can determine a vagueness score 210 of at least one of the ontologies (e.g., ontology 200). The vagueness score 210 can be indicative of a level of specificity associated with the object types of at least one of the ontologies (e.g., 200). The computing device(s) 114 can determine a vagueness score 210 of a particular ontology (e.g., 200) based at least in part on the user input 110 and the respective ontology 200. For example, the vagueness score 210 can indicate the level of specificity of object type that can be searched within the particular ontology given the state of the user input (e.g., the n-grams included in the user input). The vagueness score 210 can allow the computing device(s) 114 to determine the level of object type to search within the ontology 200. For example, in the event that the user input 110 is broad (e.g., "SKIN"), the vagueness score 210 will be lower, and the computing device(s) 114 can identify broader, more parent-level object types (e.g., "human skin"). In the event that the user input 110 is more specific (e.g., "SKIN DISEASES"), the vagueness score 210 will be higher, and the computing device(s) 114 can identify more specific object types within the ontology 200 (e.g., "skin disease side effects"). Accordingly, the computing device(s) 114 can identify the most granular object types possible based, at least in part, on the originating object 212 (e.g., the user input 110, autocomplete suggestions 206, vectors thereof) and its associated level of specificity.

The computing device(s) 114 can be configured to determine a confidence score 214 for each respective object type 202 of the selected object type(s). The confidence score 214 can be indicative of a confidence in the relatedness between the respective object type 202 and the user input 110 (and/or the autocomplete suggestions 206). For example, the computing device(s) 114 may have a high confidence level in the relatedness of the object type for "skin disease side effects" and "skin disease medications" for the user input "SKIN DIS," but may have a lower confidence in the object type for "sun effects."

The computing device(s) 114 can be configured to determine one or more of the suggested related object(s) based, at least in part, on the one or more object type(s) 202 and the confidence score 214 for the respective object type 202. For instance, the computing device(s) 114 can select one or more object type(s) 202 that have the highest confidence scores. The computing device(s) 114 can identify the objects 204 (e.g., terms) associated with those object types 202 as suggested related objects for the user input 110 (and/or the autocompleted suggestions 206). For example, the computing device(s) 114 can determine that the objects 204 (e.g., terms: "hair loss," "arthritis," "redness") of the object type 202 for "skin disease side effects" are related to the user input 110 (e.g., "SKIN DIS") and, thus, should be suggested to the user 106.

Returning to FIG. 1, the computing device(s) 114 can be configured to provide data 120 indicative of the suggested related objects for display on a user interface via the display device 108. This can occur after and/or while the user 106 is provided the user input 110. In this way, the computing device(s) 114 can suggest related objects to the user 106 in real-time and/or near real-time. The suggested related objects (e.g., the associated terms) can be displayed on the user interface with at least one of the user input 110 and the autocomplete suggestion(s) 206 for the user input 110. The user 106 can select one or more of the suggested related object(s) (e.g., terms) for inclusion in the input (e.g., for inclusion in the search query) via interaction with the user interface. In this way, the system 100 can expand, for example, a search query of the user 106 beyond simply an autocomplete function in real-time and/or near real-time.

In some implementations, the computing device(s) 114 can be configured to provide the data 120 indicative of the suggested related objects for display based, at least in part, on the vagueness score 210. For instance, the vagueness score 210 can change as the level of specificity associated with the object types (and/or user input 110) changes. For example, as the user 106 provides additional characters for the user input 110 the level of specificity can increase. Accordingly, the vagueness score 210 can increase due to the input becoming more specific (e.g., less vague). An increase in the vagueness score 210 can allow the computing device(s) 114 to identify more specific object types that can be, for example, more closely related to the user input 110.

In some implementations, the data 120 indicative of the suggested related objects can be displayed on a user interface based, at least in part, on the vagueness score 210. The computing device(s) 114 can be configured to provide the data 120 indicative of the suggested related objects for display on a user interface when the vagueness score 210 exceeds a threshold 122. The threshold 122 can be indicative of a minimum vagueness score required for the computing device(s) 114 to determine suggested related objects of the user input 110. Additionally, or alternatively, the vagueness score 210 can indicate the vagueness score required for the suggested related objects to be displayed for a user 106. The vagueness score 210 exceeding the threshold 122 may be interpreted as an indication that that the user input 110 and/or identified object types 202 are sufficiently precise that a confidence that the suggested related objects are likely to be relevant to the user input 110 is above a certain level. By providing the data 120 indicative of the suggested related objects when the vagueness score 210 exceeds the threshold 122, the computational resources associated with provision and display of the data 120 may be preserved until the suggested related objects are sufficiently likely to be relevant. This can increase the potential usefulness of the suggested related objects to the user 106.

Figure 3:
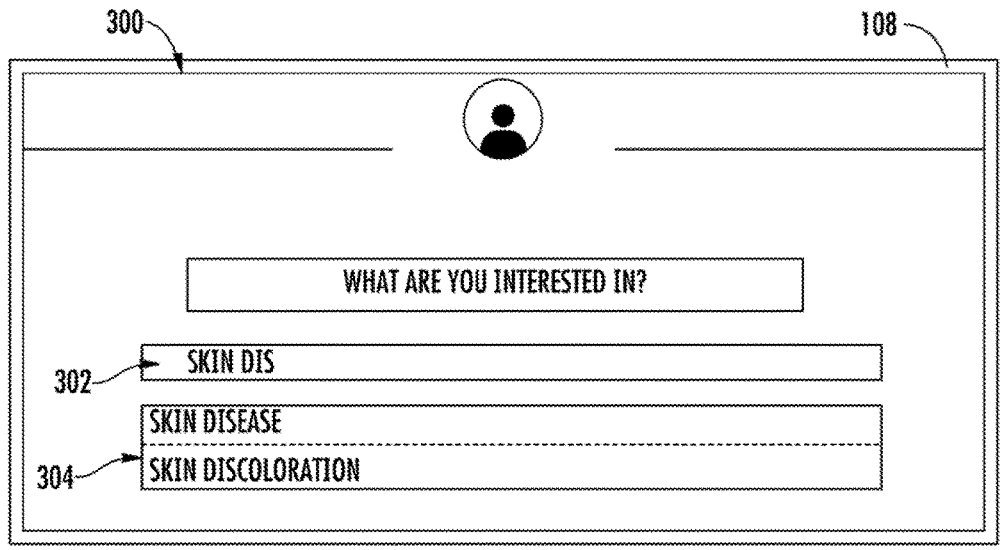
FIG. 3 depicts an example user interface according to example embodiments of the present disclosure.
Figure 4:
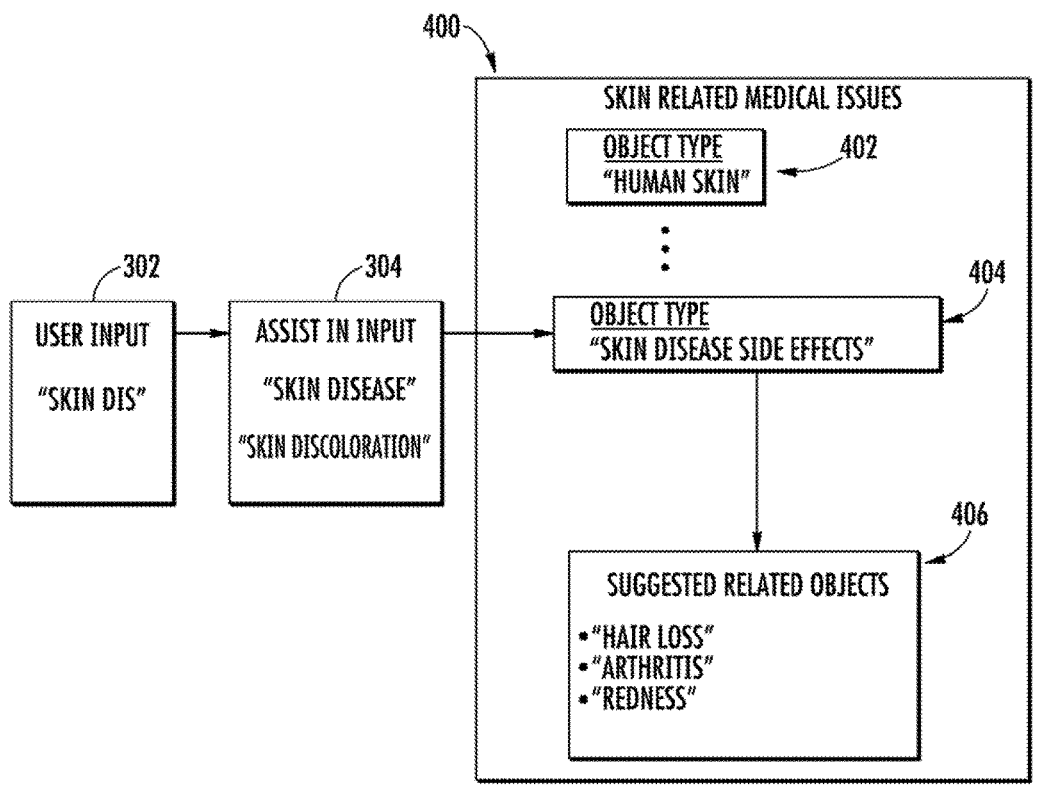
FIG. 4 depicts an example mapping to an example ontology according to example embodiments of the present disclosure.
Figure 5:
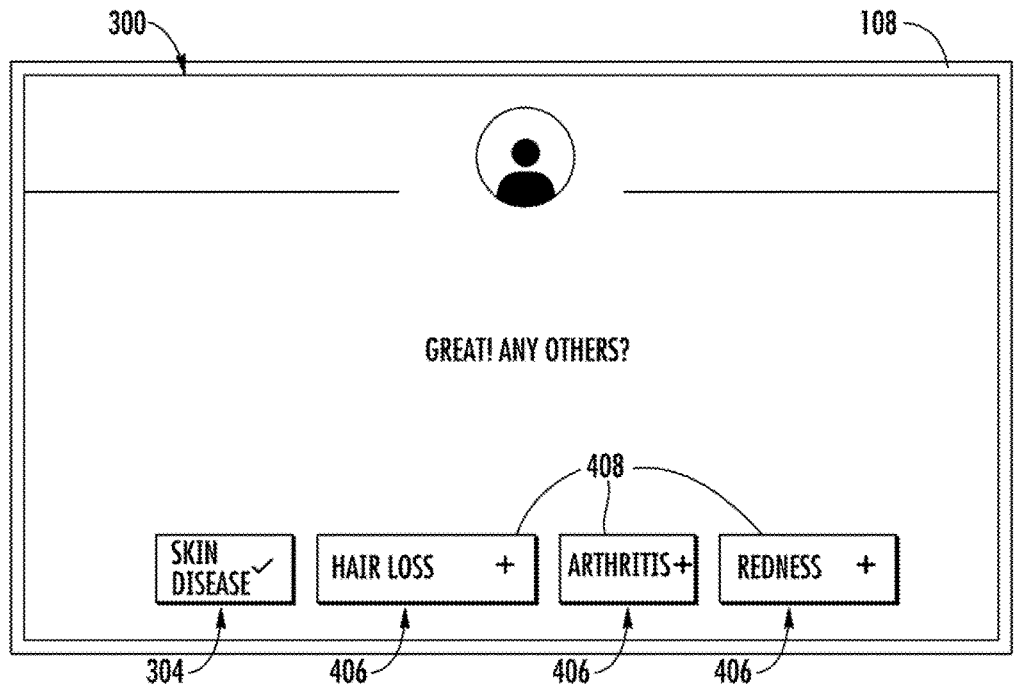
FIG. 5 depicts an example user interface according to example embodiments of the present disclosure.

FIGS. 3-5 depict an example implementation of the systems and methods of the present disclosure for illustration purposes and are not meant to be limiting. Referring to FIG. 3, a user (e.g., 106) can provide a user input 302 including the n-gram "SKIN DIS". The user computing device 102 and/or the computing system 104 can provide one or more autocomplete suggestion(s) 304 for the user input 302, such as "SKIN DISEASE" and/or "SKIN DISCOLORATION". The autocomplete suggestion(s) 304 can be selectable by the user 106 such that the autocomplete suggestion(s) 304 can be included in an input for which the computing device(s) 114 will use to map an ontology.

As shown in FIG. 4, the computing device(s) 114 can identify one or more ontologies (e.g., an ontology 400) to help determine one or more suggested related object(s) based, at least in part, on the user input 302 and/or the autocomplete suggestion(s) 304. For example, the computing device(s) 114 can select an ontology 400 that is associated with skin related medical issues based, at least in part, on the user input (e.g., "SKIN DIS") and/or the autocomplete suggestion(s) (e.g., "SKIN DISEASE"). The ontology 400 can include a plurality of object types. For example, the ontology 400 can include a broader, parent object type 402 for "human skin." The ontology 400 can also include a more specific object type 404 (e.g., a lead node object type) for "skin disease side effects." As described herein, the computing device(s) 114 can select the most granular object type possible given the user input 302 and/or the autocomplete suggestion(s) 304, and the associated vagueness score 210.

The computing device(s) 114 can determine one or more suggested related object(s) 406. For example, the computing device(s) 114 can identify a plurality of object types for user input 302 and/or the autocomplete suggestion(s) 304. The computing device(s) 114 can determine a confidence score for the object type 404 (e.g., "skin disease side effects"), which may be higher that the confidence scores determined for other identified object types. The computing device(s) 114 can select one or more object(s) associated with the object type 404 as suggested related objects 406. For example, the "skin disease side effects" object type may include terms such as "hair loss," "arthritis," "redness," etc. that can be selected as suggested related objects 406 for the user 106.

As shown in FIG. 5, the suggested related object(s) 406 can be displayed on the user interface 300 (e.g., via the display device 108) for a user (e.g., 106). The terms "hair loss," "arthritis," "redness," can be displayed with the user input 302 and/or the autocomplete suggestion(s) 304 (selected by the user). The suggested related objects 406 can be selected by a user via interaction with the user interface 300. For instance, a user can interact with (e.g., tap, click on) the one or more interface element(s) 408 to select one or more of the suggested related object(s) 406 (e.g., the terms "hair loss," "arthritis," "redness,"). Upon selection, the suggested related object(s) 406 (e.g., terms) can be included with, supplement, and/or replace the user input 302 and/or the autocomplete suggestions 304 (e.g., in a search query, profile, medical record). As such, the systems and methods of the present disclosure can provide a more enriched and broad set of results for the user in real-time and/or near real-time.

Figure 6:
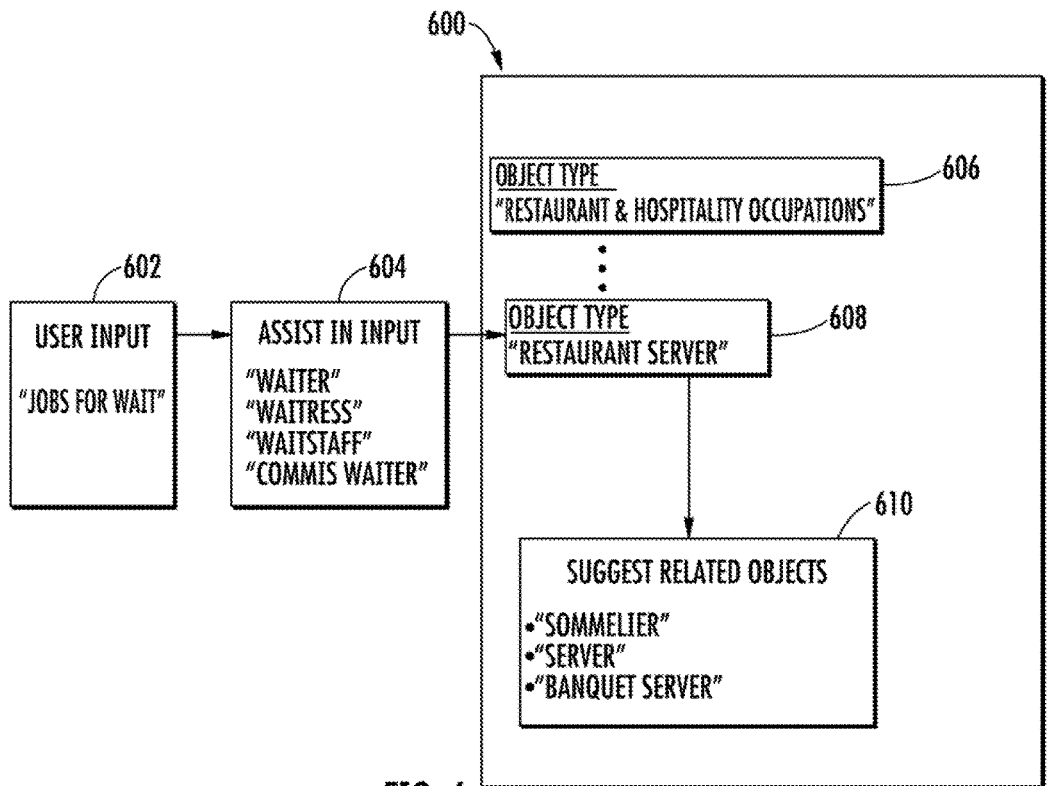
FIG. 6 depicts an another example mapping to an example ontology according to example embodiments of the present disclosure.

FIG. 6 depicts another example mapping to an example ontology 600 according to example embodiments of the present disclosure. FIG. 6 is provided for illustration purposes and is not meant to be limiting. As shown, the user input 602 can include the n-gram "JOBS FOR WAIT". This can be provided by a user (e.g., 106) that intends to search for waiting type jobs. As described herein, the user input 602 need not be completed by the user and can include partial terms and/or phrases. The computing device(s) 114 can perform the operations and functions for autosuggesting related objects to a user based, at least in part, on one or more partial term(s) and/or phrase(s) and/or while the user computing device 102 is receiving the user input 110. For example, the computing device(s) 114 can provide autocomplete suggestion(s) 604 such as "WAITER," 'WAITRESS," "WAITSTAFF," "COMMIS WAITER".

The ontology 600 can include a plurality of object types. For example, the ontology 600 can include an object type 606 for "restaurant & hospitality occupations" (e.g., a broader, parent object type) and/or an object type 404 for "restaurant server" (e.g., a more specific, lead node object type). In this example, the computing device(s) 114 can select the object type 404 for "restaurant server," as it is the more granular object type that is related to the user input 602 and/or the autocomplete suggestion(s) 604. The computing device(s) 114 can determine one or more suggested related object(s) 610 based, at least in part, on one or more object(s) associated with the object type 608. For example, the computing device(s) 114 can determine that the term(s) "sommelier," "server," and/or "banquet server" are related to the user input 602 (and/or the autocomplete suggestion(s) 604). The computing device(s) 114 can provide data indicative of the suggested related object(s) 610 to the user computing device 102 for display on a user interface for a user (e.g., 106) to select, as similarly described herein.

Figure 7:
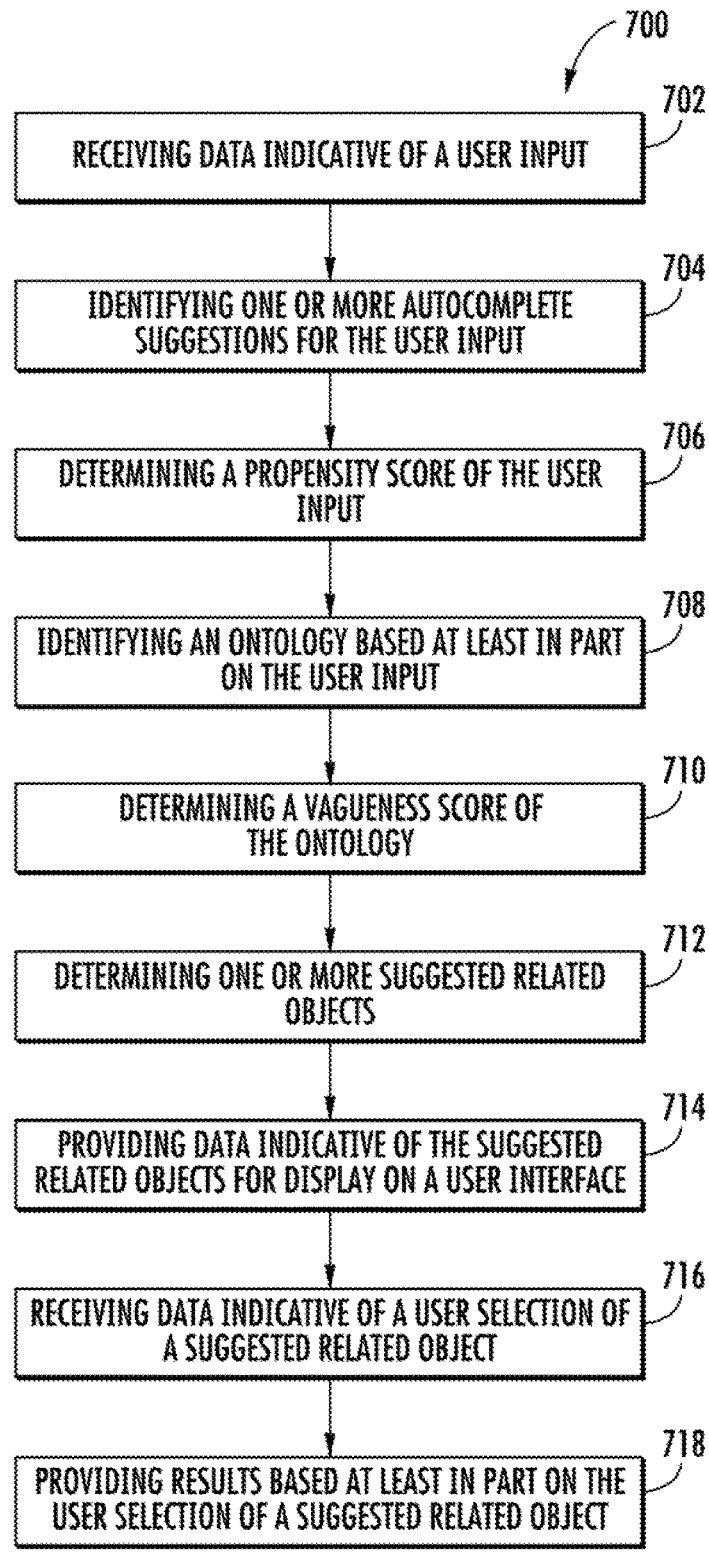
FIG. 7 depicts a flow diagram of an example method of autosuggesting related objects to a user according to example embodiments of the present disclosure.

FIG. 7 depicts a flow chart of an example method 700 of autosuggesting related objects to a user of a user interface according to example embodiments of the present disclosure. One or more portion(s) of method 700 can be implemented by a user computing device (e.g., 102) and/or other computing device(s) (e.g., 114), such as, for example, those shown in FIGS. 1 and 9. One or more portion(s) of method 700 can be implemented as an algorithm on the hardware (e.g., computer components) of FIGS. 1 and 9 to perform the computer-implemented function(s) as set forth in the claims. FIG. 7 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. The method 700 is described herein as being performed by the computing device(s) 114 of the computing system 104 for purposes of illustration. The method 700 can be performed by the user computing device 102.

At (702), the method 700 can include receiving data indicative of user input. For instance, the computing device(s) 114 can receive data 112 indicative of a user input 110 that includes an n-gram of one or more character(s). The n-gram can form one or more word(s) and/or one or more partial word(s). By way of example, a user 106 intending to search for jobs in restaurant waiting can provide the user input 602 "JOBS FOR WAIT".

In some implementations, the computing device(s) 104 can identify one or more autocomplete suggestion(s) for the user input, at (704). The autocomplete suggestion(s) can be based, at least in part, on crowd-sourcing techniques that identify popular autocomplete suggestion(s). By way of example, for a user input 602 of "JOBS FOR WAIT" the autocomplete suggestion(s) 604 can include "WAITER," 'WAITRESS," "WAITSTAFF," "COMMIS WAITER". The computing device(s) 114 can provide data indicative of the autocomplete suggestion(s) (e.g., 604) for display. The autocomplete suggestion(s) (e.g., 604) can be provided to the user 106 via a user interface on the user computing device 102 (e.g. display device 108).

In some implementations, at (706), the method 700 can include determining a propensity score of the user input. For instance, the computing device(s) 114 can determine a propensity score 209 of the user input 602, as described herein.

At (708), the method 700 can include identifying one or more ontologies based, at least in part, on the user input. For instance, the computing device(s) 114 can access a database 118 that includes a plurality of ontologies. The computing device(s) 114 can identify an ontology (e.g., 600) based, at least in part, on a user input (e.g. 602). In some implementations, the computing device(s) 114 can select the ontology 600 (e.g., of the plurality of ontologies) based, at least in part, on one or more autocomplete suggestion(s) (e.g., 604) for the user input (e.g. 602). In some implementations, the ontology can be selected based, at least in part, on the propensity score 209.

Each ontology can be associated with a category that is related to the user input (and/or the autocomplete suggestions). By way of example, the computing device(s) 114 can identify the ontology 600 (e.g., food industry job title ontology) based, at least in part, on the user input 602 (e.g., "JOBS FOR WAIT") and/or the autocomplete suggestion(s) 604 (e.g., "WAITER," "WAITRESS," "COMMIS WAITER"). As described herein, each ontology can include a plurality of object types (e.g., 606, 608) each object type including one or more object(s) (e.g., terms).

At (710), the method 700 can include determining a vagueness score of one or more of the ontologies. For example, the computing device(s) 114 can determine a vagueness score 210 of at least one of the ontologies (e.g., 200). As described herein, the vagueness score 210 can be indicative of a level of specificity associated with the object types 202 of at least one of the identified ontologies (e.g., 200).

At (712), the method 700 can include determining one or more suggested related objects. For instance, the computing device(s) 114 can determine one or more suggested related object(s) (e.g., 610) based, at least in part, on the user input (e.g., 602) and one or more of the plurality of object type(s) (e.g., 608). The one or more suggested related object(s) (e.g., 610) can include one or more of the term(s) (e.g., "SOMMELIER," "SERVER") that are related to the user input 110. In some implementations, the computing device(s) 114 can determine the one or more suggested related object(s) (e.g., 610) based, at least in part, on the autocomplete suggestion(s) (e.g., 604) for the user input.

Figure 8:
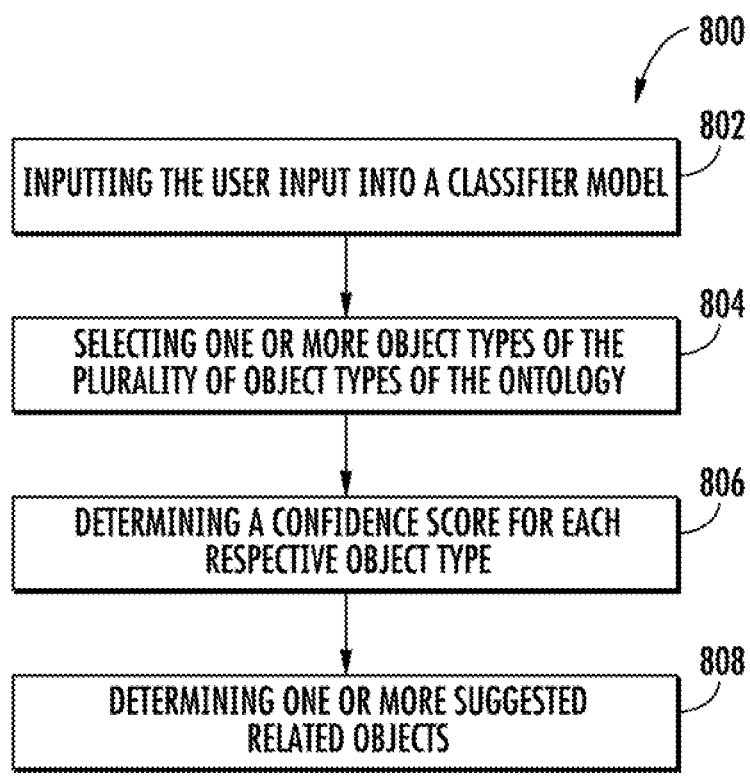
FIG. 8 depicts a flow diagram of an example method of determining suggested related objects according to example embodiments of the present disclosure.

FIG. 8 depicts a flow diagram of an example method 800 of determining suggested related objects according to example embodiments of the present disclosure. One or more portion(s) of method 800 can be implemented by a user computing device (e.g., 102) and/or other computing device(s) (e.g., 114), such as, for example, those shown in FIGS. 1 and 9. One or more portion(s) of method 800 can be implemented as an algorithm on the hardware (e.g., computer components) of FIGS. 1 and 9 to perform the computer-implemented function(s) as set forth in the claims. FIG. 8 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. The method 800 is described herein as being performed by the computing device(s) 114 of the computing system 104 for purposes of illustration. The method 700 can be performed by the user computing device 102.

At (802), the method 800 can include inputting the user input into a classifier model. For instance, the computing device(s) 114 can input the user input 110 (and/or the autocomplete suggestion(s) 206) into a model 208 (e.g., machine learned classifier model) to create one or more vector(s) based, at least in part, on the n-gram of one or more character(s) included in the user input 110 (and/or autocomplete suggestion(s) 206). As described herein, the model 208 can create a vector for each term and/or phrase of the user input 110 (and/or the autocomplete suggestions 206).

At (804), method 800 can include selecting one or more object type(s) of the plurality of object types. The computing device(s) 114 can select one or more object type(s) 202 of the ontology 200 based, at least in part, on the user input 110 and the vagueness score 210. For example, the one or more object type(s) 202 of the ontology 200 can be selected based, at least in part, on the one or more vector(s). The computing device(s) 114 can use the vectors created via the model 208 to identify one or more related object type(s) 202 within the ontology 200. The object types 202 can be associated with vectors. The computing device(s) 114 can identify vectors associated with the object type(s) 202 that are similar, close to, related to, etc. the vectors generated via the model 208. Additionally, or alternatively, the vagueness score 210 can allow the computing device(s) 114 to determine the level of granularity (e.g., parent, leaf node) of the object types that can be identified for the given user input 110, as described herein.

At (806), the method 800 can include determining a confidence score for each respective object type. The computing device(s) 114 can determine a confidence score 214 for each respective object type 202 of the one or more identified object type(s) 202. The confidence score 214 can be indicative of a relatedness between the respective object type 214 and the user input 110. The computing device(s) 114 can determine the one or more suggested related object(s) based, at least in part, on at least one of the one or more identified object type(s) 202 and/or the confidence score 214 for each respective object type of the one or more identified object type(s), at (808). For example, the computing device(s) 114 can determine one or more of the suggested related objects (e.g., 610) based, at least in part, on the object type with the highest confidence score (e.g., indicating that it is most likely related to the user input 602 and/or the autocomplete suggestion(s) 604).

In this way, the computing device(s) 114 can determine suggested related object(s) for a user 106 without the use of behavioral data associated with a user that provided the user input. The computing device(s) 114 can map a user input 110 and/or autocomplete suggestion(s) to an ontology, rather than tracking the user's behavior to determine what the user may personally believe to be related to the user input. According, the systems and methods can expand a user's query, results, etc. beyond those based on a user's browsing history.

The computing device(s) 114 can also, or alternatively, determine suggested related objects based on individual portions (e.g., characters, terms, phrases) of a user input 110 and/or a combination of the portions of the user input 110. For example, the user 106 can begins providing a user input 110 by entering the term "sta". The user 106 completes the term as "statistics" and continues to enter the term "ma". The computing device(s) 114 can suggest related objects for a first subset of the user input 110 (e.g., the term "statistics"), for a second subset of the user input 110 (e.g., the term "ma"), and/or the user input 110 as a whole (e.g., the combination "statistics ma"). The term "ma" could be "math," it could be an institution like "Massachusetts," or a degree (e.g., "master"). The suggested related objects could include, for example, applied math, MIT or related institutions, and/or masters and related degrees. In the event that the computing device(s) 114 suggest related objects for the user input as a whole (e.g., "statistics ma"), the term could be "statistics manager" and the suggested related objects could include related roles. In this way, suggested related objects can be based on individual, separate entities of the user input 110 and/or a combination thereof.

Returning to FIG. 7, at (714), the method 700 can include providing data indicative of the suggested related objects for display on a user interface. For instance, the computing device(s) 114 can provide data 120 indicative of the suggested related objects (e.g., 406) for display on a user interface (e.g., 300) via a display device 108 (e.g., of the user computing device 102). The computing device(s) 114 can provide the data 120 indicative of the suggested related objects (e.g., 406) for selection by the user 106 via the user interface (e.g., 300). In some implementations, the computing device(s) 114 can provide data 120 indicative of the suggested related objects for display on a user interface (e.g., 300) via the display device 118 when the vagueness score 210 exceeds a threshold 122, as described herein.

At (716), the method 700 can include receiving data indicative of a user selection of a suggested related object. For instance, the computing device(s) 114 can receive data indicative of a user selection of a suggested related object (e.g., term). As such the suggested related object(s) (e.g., terms, images) can be included in a search query, a profile the user is creating/editing, a medical record, etc. Moreover, the computing device(s) 114 can provide results based, at least in part, on the user selection of a suggested related object(s), at (718). This can include, for example, providing one or more search result(s) via a user interface for the user to view, editing a user profile according to the selections, creating and/or revising an electronic medical record according to the selections, etc.

Figure 9:
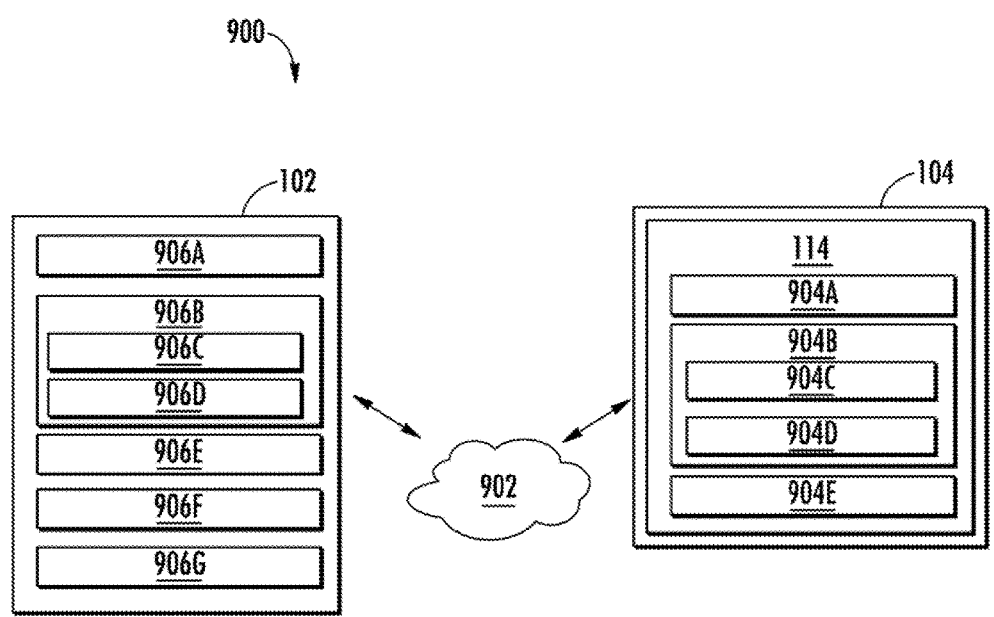
FIG. 9 depicts system components according to example embodiments of the present disclosure.

FIG. 9 depicts an example system 900 according to example embodiments of the present disclosure. The system 900 can include one or more user computing device(s) 102 and a computing system 104. The computing system 104 and the user computing device(s) 102 can be configured to communicate via one or more network(s) 902.

The computing system 104 can include one or more computing device(s) 114. The computing device(s) 114 can include one or more processor(s) 904A and one or more memory device(s) 904B. The one or more processor(s) 904A can be any suitable processing device (e.g., a processor core, a microprocessor, an ASIC, a FPGA, a controller, a microcontroller, etc.) and can be one processor or a plurality of processors that are operatively connected. The memory device(s) 904B can include one or more non-transitory computer-readable storage media, such as RAM, ROM, EEPROM, EPROM, flash memory devices, magnetic disks, etc., and/or combinations thereof.

The memory device(s) 904B can store information accessible by the one or more processor(s) 904A, including computer-readable instructions 904C that can be executed by the one or more processor(s) 904A. The instructions 904C can be any set of instructions that when executed by the one or more processor(s) 904A, cause the one or more processor(s) 904A to perform operations. In some embodiments, the instructions 904C can be executed by the one or more processor(s) 904A to cause the one or more processor(s) 904A to perform operations, such as any of the operations and functions of the computing device(s) 114 and/or for which the computing device(s) 114 are configured, as described herein, the operations for autosuggesting related objects to a user (e.g., one or more portions of methods 700, 800), and/or any other operations or functions, as described herein. The instructions 904C can be software written in any suitable programming language or can be implemented in hardware. Additionally, and/or alternatively, the instructions 904C can be executed in logically and/or virtually separate threads on processor(s) 904A.

The one or more memory device(s) 904B can also store data 904D that can be retrieved, manipulated, created, or stored by the one or more processor(s) 904A. The data 904D can include, for instance, data indicative of user input, autocomplete suggestions, an ontology, a propensity score, a vagueness score, a vagueness threshold, ontology entities/nodes (e.g., object types), a confidence score, suggested related objects, user interfaces, and/or other data or information. The data 904D can be stored in one or more database(s). The one or more database(s) can be connected to the computing device(s) 114 by a high bandwidth LAN or WAN, or can also be connected to computing device(s) 114 through network(s) 902. The one or more database(s) can be split up so that they are located in multiple locales.

The computing device(s) 114 can also include a network interface 904E used to communicate with one or more other component(s) of the system 900 (e.g., user computing device(s) 102) over the network(s) 902. The network interface 904E can include any suitable components for interfacing with one or more network(s), including for example, transmitters, receivers, ports, controllers, antennas, or other suitable components.

The user computing device(s) 102 can be any suitable type of computing device, as described herein. A user computing device 102 can include one or more processor(s) 906A and one or more memory device(s) 906B. The one or more processor(s) 906A can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 906B can include one or more non-transitory computer-readable storage medium(s), such as RAM, ROM, EEPROM, EPROM, flash memory devices, magnetic disks, etc., and/or combinations thereof.

The memory device(s) 906B can include one or more computer-readable media and can store information accessible by the one or more processor(s) 906A, including instructions 906C that can be executed by the one or more processor(s) 906A. For instance, the memory device(s) 906B can store instructions 906C for running one or more software applications, displaying a user interface, receiving user input, processing user input, etc. In some implementations, the instructions 906C can be executed by the one or more processor(s) 906A to cause the one or more processor(s) 906A to perform operations, such as any of the operations and functions of the user computing device(s) 102 and/or for which the user computing device(s) 102 are configured, the operations for autosuggesting related objects to a user (e.g., one or more portions of methods 700, 800), and/or any other operations or functions of the user computing device(s) 102, as described herein. The instructions 906C can be software written in any suitable programming language or can be implemented in hardware. Additionally, and/or alternatively, the instructions 906C can be executed in logically and/or virtually separate threads on processor(s) 906A.

The one or more memory device(s) 906B can also store data 906D that can be retrieved, manipulated, created, or stored by the one or more processor(s) 906A. The data 906D can include, for instance, data indicative of a user input, data indicative of a user interface and/or other data/information described herein. In some implementations, the data 906D can be received from another device.

The user computing device(s) 102 can also include a network interface 906E used to communicate with one or more other component(s) of system 900 (e.g., computing device(s) 114) over the network(s) 902. The network interface 906E can include any suitable components for interfacing with one or more network(s), including for example, transmitters, receivers, ports, controllers, antennas, or other suitable components.

The user computing device(s) 102 can include one or more input component(s) 906F and/or one or more output component(s) 906G. The input component(s) 906F can include, for example, hardware for receiving information from a user, such as a touch screen, touch pad, mouse, data entry keys, speakers, a microphone suitable for voice recognition, etc. The output component(s) 906G can include hardware for audibly producing audio content for a user. For instance, the output component 906G can include one or more speaker(s), earpiece(s), headset(s), handset(s), etc. The output component(s) 906G can include a display device (e.g., 118), which can include hardware for displaying a user interface and/or other information for a user. By way of example, the output component 906G can include a display screen, CRT, LCD, plasma screen, touch screen, TV, projector, and/or other suitable display components.

The network(s) 902 can be any type of communications network, such as a local area network (e.g. intranet), wide area network (e.g. Internet), cellular network, or some combination thereof and can include any number of wired and/or wireless links. The network(s) 902 can also include a direct connection between one or more component(s) of system 900. In general, communication over the network(s) 902 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer processes discussed herein can be implemented using a single computing device or multiple computing devices (e.g., servers) working in combination. Databases and applications can be implemented on a single system or distributed across multiple systems. Distributed components can operate sequentially or in parallel.

Furthermore, computing tasks discussed herein as being performed at the computing system (e.g., a server system) can instead be performed at a user computing device. Likewise, computing tasks discussed herein as being performed at the user computing device can instead be performed at the computing system.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of autosuggesting related objects to a user, comprising:
    receiving, by one or more computing devices, data indicative of a user input that comprises an n-gram of one or more characters;
    identifying, by the one or more computing devices, one or more ontologies based at least in part on the n-gram of one or more characters, wherein each ontology is associated with a category that is related to the user input, and wherein each ontology comprises a plurality of object types, each object type comprising one or more terms;
    determining, by the one or more computing devices, one or more suggested related objects based at least in part on the n-gram of one or more characters and one or more of the plurality of object types, wherein the one or more suggested related objects include one or more of the terms that are related to the user input; and
    providing, by the one or more computing devices, data indicative of the suggested related objects for display on a user interface via a display device.

2. The computer-implemented method of claim 1, further comprising:
    identifying, by the one or more computing devices, one or more autocomplete suggestions for the user input.

3. The computer-implemented method of claim 2, wherein identifying, by the one or more computing devices, the one or more ontologies based at least in part on the n-gram of one or more characters comprises:
    identifying, by the one or more computing devices, the one or more ontologies based at least in part on the one or more autocomplete suggestions for the user input.

4. The computer-implemented method of claim 2, wherein determining, by the one or more computing devices, the one or more suggested related objects based at least in part on the n-gram of one or more characters and one or more of the plurality of object types comprises:
    determining, by the one or more computing devices, the one or more suggested related objects based at least in part on the autocomplete suggestions for the user input.

5. The computer-implemented method of claim 1, further comprising:
    determining, by the one or more computing devices, a vagueness score of at least one of the ontologies, wherein the vagueness score is indicative of a level of specificity associated with the object types of the ontologies.

6. The computer-implemented method of claim 5, wherein
    determining, by the one or more computing devices, one or more suggested related objects based at least in part on the n-gram of one or more characters and one or more of the plurality of object types comprises:
    selecting, by the one or more computing devices, one or more object types of at least one of the ontologies based at least in part on the user input and the vagueness score;
    determining, by the one or more computing devices, a confidence score for each respective selected object type, wherein the confidence score is indicative of a relatedness between the respective object type and the user input;
    determining, by the one or more computing devices, one or more of the suggested related objects based at least in part on the object type with the highest confidence score.

7. The computer-implemented method of claim 5, wherein providing, by the one or more computing devices, the data indicative of the suggested related objects for display on the user interface via the display device comprises:
    providing, by the one or more computing devices, the data indicative of the suggested related objects for display on the user interface via the display device when the vagueness score exceeds a threshold.

8. The computer-implemented method of claim 1, wherein the one or more suggested related objects are determined without the use of behavioral data associated with a user that provided the user input.

9. The computer-implemented method of claim 1, wherein providing, by the one or more computing devices, data indicative of the suggested related objects for display on the user interface via the display device comprises:
    providing the data indicative of the suggested related objects for selection by the user via the user interface.

10. The computer-implemented method of claim 1, wherein the suggested related objects are one or more terms that do not exactly match the n-gram of one or more characters.

11. A computing system for autosuggesting related objects to a user, comprising:
one or more processors; and
one or more memory devices, the one or more memory devices storing instructions that when executed by the one or more processors cause the one or more processors to perform operations, the operations comprising:
receiving data indicative of a user input that comprises an n-gram of one or more characters;
identifying one or more autocomplete suggestions for the user input;
identifying one or more ontologies based at least in part on at least one of the n-gram of one or more characters and the autocomplete suggestions for the user input, wherein each ontology is associated with a category that is related to at least one of the user input and the autocomplete suggestions for the user input, and wherein each ontology comprises a plurality of object types, each object type comprises one or more terms;
determining one or more suggested related objects based at least in part on one or more of the plurality of object types, wherein the one or more suggested related objects comprise one or more of the terms that are related to at least one of the user input and the autocomplete suggestions; and
providing data indicative of the suggested related objects for display on a user interface via a display device.

12. The computing system of claim 11, wherein determining one or more suggested related objects based at least in part on one or more of the plurality of object types comprises:
selecting one or more object types of the plurality of object types of the one or more ontologies based at least in part on the n-gram of one or more characters;
determining a confidence score for each respective object type of the one or more object types, wherein the confidence score is indicative of a confidence in the relatedness between the respective object type and the n-gram of one or more characters; and
determining one or more of the suggested related objects based at least in part on the one or more object types and the confidence score for the respective object types.

13. The computing system of claim 11, wherein the operations further comprise:
inputting the user input into a machine-learned classifier model to create one or more vectors based at least in part on the n-gram of one or more characters.

14. The computing system of claim 11, wherein providing the data indicative of the suggested related objects for display on the user interface via the display device comprises:
providing the data indicative of the suggested related objects for display on the user interface via the display device while a user is providing the user input.

15. The computing system of claim 11, wherein the terms of the suggested related objects are displayed on the user interface with at least one of the user input and the autocomplete suggestions for the user input.

16. The computing system of claim 11, wherein providing the data indicative of the suggested related objects for display on the user interface via the display device comprises:
providing the data indicative of the suggested related objects for display on the user interface via the display device when a vagueness score exceeds a threshold, wherein the vagueness score is indicative of a level of specificity associated with the object types of at least one of the ontologies.

17. The computing system of claim 11, wherein the one or more suggested related objects are determined without the use of behavioral data associated with a user that provided the user input.

18. One or more tangible, non-transitory computer-readable media storing computer-readable instructions that when executed by one or more processors cause the one or more processors to perform operations, the operations comprising:
receiving data indicative of a user input that comprises an n-gram of one or more characters;
identifying one or more autocomplete suggestions for the user input;
identifying one or more ontologies based at least in part on at least one of the n-gram of one or more characters and the autocomplete suggestions for the user input, wherein each ontology is associated with a category that is related to at least one of the user input and the autocomplete suggestions for the user input, and wherein each ontology comprises a plurality of object types, each object type comprising one or more terms;
determining one or more suggested related objects based at least in part on one or more of the plurality of object types and at least one of the user input and the autocomplete suggestions for the user input; and
providing data indicative of the suggested related objects for display on a user interface via a display device.

19. The one or more tangible, non-transitory computer-readable media of claim 18, wherein determining the one or more suggested related objects comprises:
determining a vagueness score of at least one of the ontologies, wherein the vagueness score is indicative of a level of specificity associated with the object types of the at least one ontology;
selecting one or more object types of the ontology based at least in part on the user input and the vagueness score;
determining a confidence score for each respective object type of the one or more selected object types;
determining one or more of the suggested related objects based at least in part on the one or more object types and the respective confidence score for each respective object type of the one or more selected object types.

20. The one or more tangible, non-transitory computer-readable media of claim 19, wherein the operations further comprise:
inputting the user input into a classifier model to create one or more vectors based at least in part on the n-gram of one or more characters, and
wherein the one or more object types of the ontology are selected based at least in part on the one or more vectors.

21. The one or more tangible, non-transitory computer-readable media of claim 19, wherein the vagueness score changes as the user input changes, and wherein the data indicative of the suggested related objects is displayed on the user interface based at least in part on the vagueness score.

22. The computer-implemented method of claim 21, wherein determining, by the one or more computing devices, one or more suggested related objects based at least in part on the user input and one or more of the plurality of object types comprises:
- selecting, by the one or more computing devices, one or more object types of at least one of the ontologies based at least in part on the user input and the vagueness score;
- determining, by the one or more computing devices, a confidence score for each respective selected object type, wherein the confidence score is indicative of a relatedness between the respective object type and the user input; and
- determining, by the one or more computing devices, one or more of the suggested related objects based at least in part on the object type with the highest confidence score.

23. The computer-implemented method of claim 21, wherein providing, by the one or more computing devices, the data indicative of the suggested related objects for display on the user interface via the display device comprises:
- providing, by the one or more computing devices, the data indicative of the suggested related objects for display on the user interface via the display device when the vagueness score exceeds a threshold.

24. A computer-implemented method of autosuggesting related objects to a user, comprising:
- receiving, by one or more computing devices, data indicative of a user input that comprises an n-gram of one or more characters;
- identifying, by the one or more computing devices, one or more ontologies based at least in part on the user input, wherein each ontology is associated with a category that is related to the user input, and wherein each ontology comprises a plurality of object types, each object type comprising one or more terms;
- determining, by the one or more computing devices, a vagueness score of at least one of the ontologies, wherein the vagueness score is indicative of a level of specificity associated with the object types of the ontologies;
- determining, by the one or more computing devices, one or more suggested related objects based at least in part on the user input and one or more of the plurality of object types, wherein the one or more suggested related objects include one or more of the terms that are related to the user input; and
- providing, by the one or more computing devices, data indicative of the suggested related objects for display on a user interface via a display device.

* * * * *